(12) United States Patent
ShanBhogue et al.

(10) Patent No.: US 8,955,144 B2
(45) Date of Patent: Feb. 10, 2015

(54) PROTECTING INFORMATION PROCESSING SYSTEM SECRETS FROM DEBUG ATTACKS

(71) Applicants: Vedvyas ShanBhogue, Austin, TX (US); Jason W. Brandt, Austin, TX (US); Jeff Wiedemeier, Austin, TX (US)

(72) Inventors: Vedvyas ShanBhogue, Austin, TX (US); Jason W. Brandt, Austin, TX (US); Jeff Wiedemeier, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/929,945

(22) Filed: Jun. 28, 2013

(65) Prior Publication Data

US 2015/0006968 A1    Jan. 1, 2015

(51) Int. Cl.
*G06F 9/44* (2006.01)
*G06F 11/07* (2006.01)

(52) U.S. Cl.
CPC ............................... *G06F 11/0727* (2013.01)
USPC ............... 726/26; 717/127; 717/128; 706/47; 707/694

(58) Field of Classification Search
USPC ........ 726/26; 717/128, 127; 706/47; 707/694
See application file for complete search history.

(56) References Cited

U.S. PATENT DOCUMENTS

| | | | |
|---|---|---|---|
| 6,981,244 B1 * | 12/2005 | Kathail et al. | 717/124 |
| 7,320,123 B2 * | 1/2008 | Govindarajapuram et al. | 717/124 |
| 7,669,186 B2 * | 2/2010 | Nolan et al. | 717/124 |
| 7,721,262 B2 * | 5/2010 | Reinhardt | 717/124 |
| 7,765,525 B1 * | 7/2010 | Davidson et al. | 717/124 |
| 7,831,570 B2 * | 11/2010 | Sack et al. | 707/694 |
| 7,984,513 B1 * | 7/2011 | Kyne et al. | 726/30 |
| 7,996,823 B2 * | 8/2011 | Arnold et al. | 717/128 |
| 8,001,094 B2 * | 8/2011 | Machida et al. | 707/694 |
| 8,271,418 B2 * | 9/2012 | Allen et al. | 706/47 |
| 8,464,241 B2 * | 6/2013 | Hayton | 717/170 |
| 8,510,713 B1 * | 8/2013 | Ormandy | 717/124 |
| 8,555,238 B2 * | 10/2013 | White et al. | 717/100 |
| 8,769,522 B2 * | 7/2014 | Venkatraman et al. | 717/173 |

* cited by examiner

*Primary Examiner* — Haresh N Patel
(74) *Attorney, Agent, or Firm* — Thomas R. Lane (57) ABSTRACT

Embodiments of an invention for protecting information processing system secrets from debug attacks are disclosed. In one embodiment, a processor includes storage, a debug unit, and a test access port. The debug unit is to receive a policy from a debug aggregator. The policy is based on a value of a first fuse and has a production mode corresponding to a production value of the first fuse and a debug mode corresponding to a debug value of the fuse. The test access port is to provide access to the storage using a debug command in the debug mode and to prevent access to the storage using the debug command in the production mode.

7 Claims, 6 Drawing Sheets

FIGURE 2

FIGURE 4
METHOD 400

FIGURE 5
METHOD 500

FIGURE 6
METHOD 600

PROTECTING INFORMATION PROCESSING SYSTEM SECRETS FROM DEBUG ATTACKS

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated partition or environment within an information processing system.

BRIEF DESCRIPTION OF THE FIGURES

The present invention is illustrated by way of example and not limitation in the accompanying figures.

DETAILED DESCRIPTION

Embodiments of an invention for protecting secrets from debug attacks are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bits," "flags," "fields," "entries," "indicators," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, various approaches to creating and maintaining a secured, protected, or isolated partition or environment within an information processing system have been developed. One such approach involves secure enclaves as described in the co-pending U.S. Patent Application entitled "Method and Apparatus to Provide Secure Application Execution," filed Jun. 19, 2012, Ser. No. 13/527,547, which is hereby incorporated by reference as an example of at least one embodiment of a secure enclave. However, the incorporated reference is not intended to limit the scope of embodiments of the invention in any way and other embodiments may be used while remaining within the spirit and scope of the invention.

Figure 1:
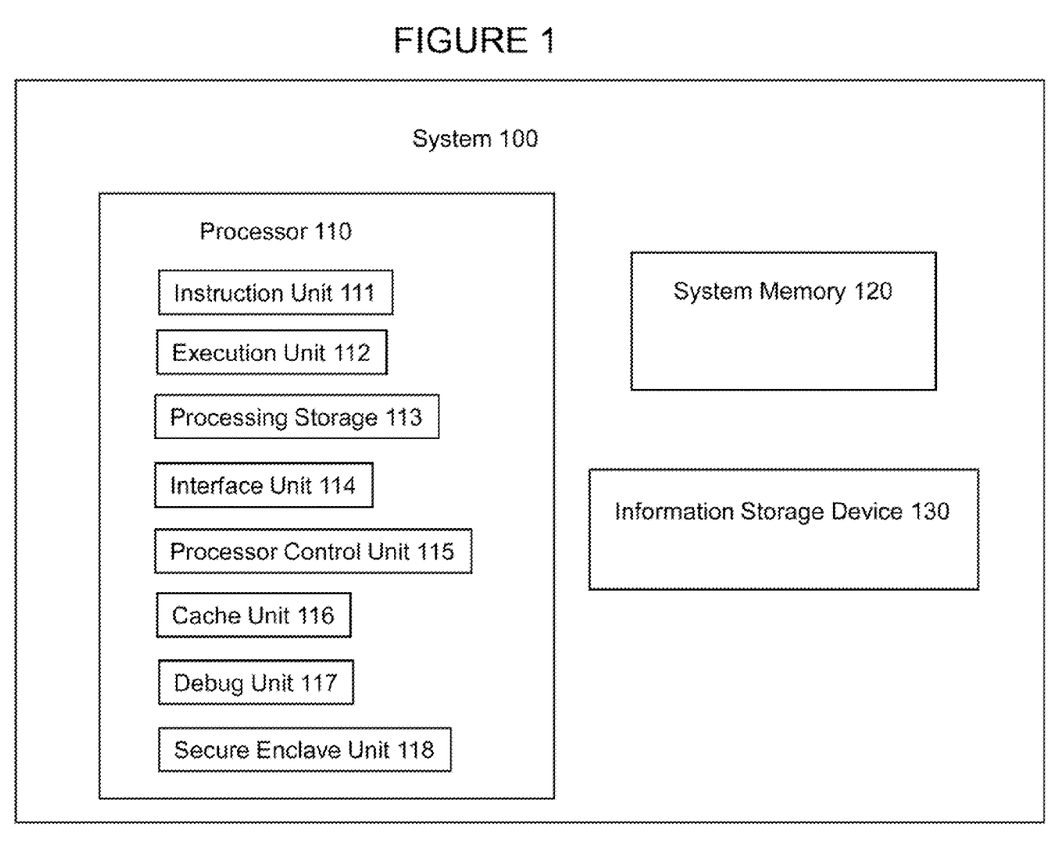
FIG. 1 illustrates a system wherein secrets may be protected from debug attacks according to an embodiment of the present invention.

FIG. 1 illustrates system 100, an information processing system wherein secrets may be protected from debug attacks according to an embodiment of the present invention. System 100 may represent any type of information processing system, such as a server, a desktop computer, a portable computer, a set-top box, a hand-held device, or an embedded control system. System 100 includes processor 110, system memory 120, and information storage device 130. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise.

System memory 120 may be dynamic random access memory or any other type of medium readable by processor 110. Information storage device 130 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction unit 111, execution unit 112, processing storage 113, interface unit 114, processor control unit 115, cache unit 116, debug unit 117, and secure enclave unit 118. Processor 110 may also include any other circuitry, structures, or logic not shown in FIG. 1, and/or any circuitry, structures, or logic shown or described as elsewhere in FIG. 1.

Instruction unit 111 may represent any circuitry, structure, or hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 112.

Execution unit 112 may include any circuitry, structure, or hardware, such as an arithmetic unit, logic unit, floating point unit, shifter, etc., for processing data and executing instructions, micro-instructions, and/or micro-operations.

Processor storage 113 may represent any type of storage usable for any purpose within processor 110; for example, it may include any number of data registers, instruction registers, status registers, configuration registers, control registers, other programmable or hard-coded registers or register files, buffers, and/or any other storage structures.

Interface unit 114 may represent any circuitry, structure, or hardware, such as a bus unit, messaging unit, or any other port or unit to allow processor 110 to communicate with other components in system 100 through any type of bus, point to point, or other interface or connection, directly or through any other component, such as a memory controller or a bus bridge.

Processor control unit 115 may include any logic, microcode, circuitry, or hardware to control the operation of the units and other elements of processor 110 and the transfer of data within, into, and out of processor 110. Processor control unit 115 may cause processor 110 to perform or participate in the performance of method embodiments of the present invention, such as the method embodiments described below, for example, by causing processor 110 to execute instructions received by instruction unit 111 and micro-instructions or micro-operations derived from instructions received by instruction unit 111.

Cache unit 116 may represent any one or more levels of cache memory in a memory hierarchy of information processing system 100, implemented in static random access memory or any other memory technology. Cache unit 116 may include any combination of cache memories dedicated to or shared among any one or more execution cores or processors within processor 110 according to any known approaches to caching in information processing systems.

Debug unit 117 may represent any circuitry, hardware, logic, state machines, or other structures for testing or debugging processor 110, system 100, and/or software and/or firmware on processor 110 and/or system 100. In one embodiment, debug unit 117 may include one or more test access ports (TAPs) designed to function in compliance with a standard such as Institute of Electrical and Electronic Engineers (IEEE) 1149.1 Standard Test Access Port and Boundary-Scan Architecture originally developed by the Joint Test Action Group (JTAG), or any other test or debug standard or protocol.

Secure enclave unit 118 may represent any logic, circuitry, hardware, or structures for creating and maintaining a secured, protected, or isolated environment, such as a secure enclave as described herein, in which an application or other software may run, execute, be loaded, or otherwise be present within an information processing system such as system 100. For purposes of this description, each instance of such an environment may be referred to as a secure enclave, although embodiments of the present invention are not limited to those using a secure enclave as the secured, protected, or isolated environment. In one embodiment, a secure enclave may be created and maintained using instructions in the instruction set of a processor in the Intel® Core® Processor Family, Intel® Atom® Processor Family, or other processor family from Intel® Corporation.

Figure 2:
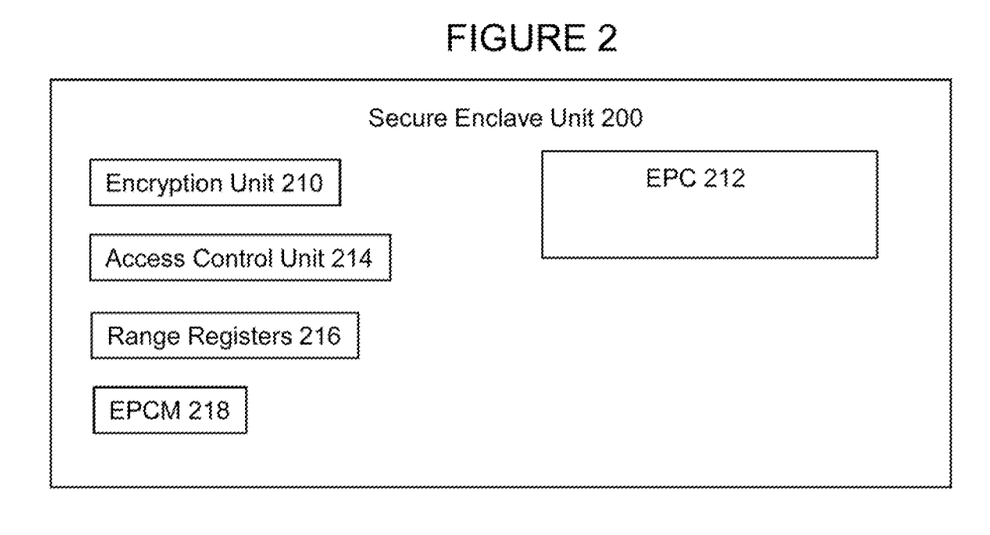
FIG. 2 illustrates a secure enclave unit according to an embodiment of the present invention.

FIG. 2 illustrates secure enclave unit 200, an embodiment of which may serve as secure enclave unit 118 in system 100. All or part of secure enclave unit 200 may be included within any one or more other units of processor 110, such as instruction unit 111, execution unit 112, processor storage 113, processor control unit 115, and cache unit 116.

Secure enclave unit 200 may include encryption unit 210, which may include any logic, circuitry, or other hardware to execute any one or more encryption algorithms and the corresponding decryption algorithms, and may include logic, circuitry, or other hardware shared with another encryption unit in processor 110.

Secure enclave unit 200 may also include enclave page cache (EPC) 212. In one embodiment, EPC 212 may be a dedicated portion of cache unit 116, such as a portion of a last level cache. Other embodiments are possible, including embodiments in which all or part of EPC 212 may be outside of processor 110. EPC 212 may be used to store unencrypted code and data for one or more secure enclaves. Access control unit 214, range register(s) 216, and EPC map (EPCM) 218 may be used to prevent access to a page within EPC 212 except by an application running on processor 110 within the secure enclave to which the page is allocated.

Embodiments of the present invention provide for protecting information within a secured, protected, or isolated partition or environment, such as a secure enclave, from access through a mechanism provided to test or debug a processor, system, and/or software and/or firmware on the processor and/or system, where the mechanism may include private commands provided for testing or debugging.

Figure 3:
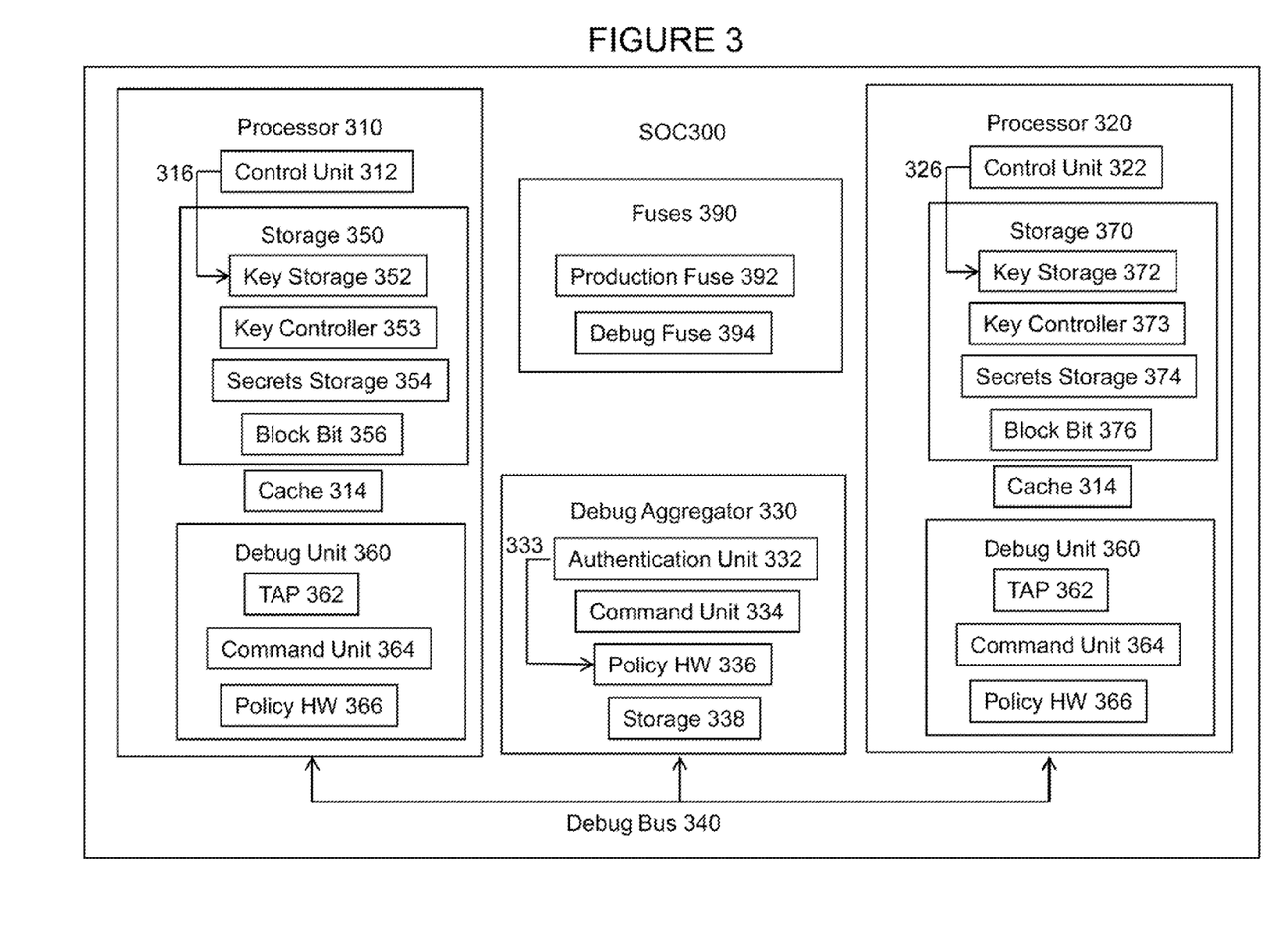
FIG. 3 illustrates a system-on-a-chip according to an embodiment of the present invention.

To illustrate, FIG. 3 illustrates an embodiment of system 100 or a portion of system 100 in system-on-a-chip (SOC) 300, which includes processor 310, processor 320, debug aggregator 330, and debug bus 340.

Processor 310 may be a processor such as processor 110 described above, including processor storage 350 corresponding to processor storage 113, processor control unit 312 corresponding to processor control unit 115, cache unit 314 corresponding to cache unit 116, and debug unit 360 corresponding to debug unit 117. Similarly, processor 320 may be such a processor including processor storage 370, processor control unit 322, cache unit 324, and debug unit 380. Debug unit 360 may include TAP 362 and debug unit 380 may include TAP 382.

Debug aggregator 330 may include any circuitry, hardware, logic, state machines, or other structures to support access to registers, buffers, caches, and other any other data storage locations through TAPs. Debug aggregator 330 may include authentication unit 332 to support the authentication of test and debug firmware or software such that authorized firmware or software ("authenticated debuggers") may use private debug commands to access storage locations that may be otherwise inaccessible. To support the use of such private commands as well as public commands, debug aggregator 330 and debug units 360 and 380 may include command units 334, 364, and 384, respectively. Debug aggregator 330 and debug units 360 and 380 may also include policy hardware 336, 366, and 386, respectively, to support the enforcement of a policy regarding the use of private debug commands. Debug aggregator 330 may also include storage locations 338, which may be any type of registers or other storage structures.

Debug bus 340 may represent any secure communication path between debug aggregator 330 and debug units 360 and 380. Debug bus 340 may be included as part of any other communication path within SOC 300. Debug bus 340 may be used to communicate a debug policy or policy mode from debug aggregator 330 to debug units 360 and 380.

Processors 310 and 320 may include storage locations in which confidential information, private information, or any other secret information ("secrets") may be stored, whether or not protected in a secure enclave or any other such approach.

For example, secrets may be stored in processor storage 350, processor storage 370, cache unit 314, and/or cache unit 324.

The secrets may include cryptographic keys that may be used to encrypt or decrypt any information for any purpose, such as protecting information within a secure enclave. One or more of the cryptographic keys may be embedded in the processor during manufacturing, such as through the use of metal tie-ups and/or tie-downs. One or more of the cryptographic keys may be programmed into the processor during key provisioning or other device or system configuration processing, such as through the use of any type of fuse technology. One or more of the cryptographic keys may be generated by the processor during booting, reset, or otherwise, based on another key or any other information, such as a value of a physically uncloneable function circuit. The values of these cryptographic keys, or any subset of these cryptographic keys, may be stored in or accessible through registers or other storage, such as processor storage 350 and 370, and may be protected using embodiments of the present invention. Collectively, the storage through which these keys may be accessed is referred to as "key storage" in this description, and may include key storage 352 in processor 310 and key storage 372 in processor 320. Collectively, other storage locations in which other secrets may be stored are referred to as "secrets storage" in this description, and may include secrets storage 354 in processor 310 and secrets storage 374 in processor 320.

Any or all of the storage locations in key storage 352 and key storage 372 may be preserved across different low power or other power management states by connecting them to an always-on power rail or any other power rail that stays on during these power management states, so long as the storage location may be cleared or rendered inaccessible by a signal that may be used during these states. Such as signal may be referred to as an "unlock" signal because it may be used to unlock a TAP or indicate that a TAP is unlocked such that private debug commands may be used to access storage locations through that TAP. For example, UNLOCK signals 316 and 326, respectively, may clear key storage 352 and 372, respectively, or render them inaccessible.

In various embodiments, UNLOCK signals 316 and 326 and/or one or more signals derived from UNLOCK signals 316 and 326 may be used to clear one or more locations in key storage 352 and 372, respectively, or render them inaccessible. For example, one or more sticky bits or signals may be derived from UNLOCK signals 316 and 326 such that locations may be cleared on a first transition of UNLOCK signals 316 and/or 326 to clear any secrets before the locations are accessible to debuggers, but then the locations may be written and read by the debuggers after the first transition of UNLOCK signals 316 and/or 326 without being cleared by UNLOCK signals 316 and/or 326. Various such signals may be derived for various storage locations.

Furthermore, access by any mechanism to any or all of the storage locations in key storage 352 and key storage 372 may be controlled by key controller 353 and key controller 373, respectively.

Processors 310 and 320, debug aggregator 330, and/or SOC 300 may also include storage locations in which indicators to be used in method embodiments of the present invention may be stored. For example, these storage locations may be in processor storage 350, processor storage 370, and storage locations 338, and may be implemented in a hardware structure such as a register. Some of these storage locations may be implemented with any type of fuse technology such that they may be programmed once, by the manufacturer or otherwise.

In various embodiments, such storage locations may include BLOCK_PRIVATE_COMMANDS indicator 356, which may be implemented as a register bit in processor storage 350 used for the control of debug unit 360, readable and writeable by processor control unit 322, and BLOCK_PRIVATE_COMMANDS indicator 376, which may be implemented as a register bit in processor storage 370, readable and writeable by processor control unit 332 and used for the control of debug unit 380 as described below.

In various embodiments, such storage locations may also include fuses 390, including PRODUCTION fuse 392 and DEBUG fuse 394. Each of PRODUCTION fuse 392 and DEBUG fuse 394 may represent one or more individual programmable fuses (e.g., the state of PRODUCTION fuse 392 may be based on the state of a single fuse or a logical combination of the states of more than one fuse). In one embodiment, PRODUCTION fuse 392 may in a first ("manufacturing") state (which may be the default state) indicate that SOC 300 is still being manufactured or tested by the SOC manufacturer and may in a second ("production") state (to which the fuse may be programmed by the SOC manufacturer) indicate that SOC 300 has been released by the manufacturer and is ready to be used or is being used as a production component by a customer. In one embodiment, DEBUG fuse 394 may in a first ("production") state (which may be a default state) indicate that SOC 300 is ready to be used or is being used as a production component by customer and may in a second ("debug") state (to which the fuse may be programmed by the customer) indicate that SOC 300 is ready to be returned or has been returned to the manufacturer for debug.

Returning to debug aggregator 330, policy hardware 336 may include state machine or other circuitry or logic to determine a policy or a policy mode to be communicated over debug bus 340 to one or more TAPs. In various embodiments, the policy modes may include a "Locked" mode, a "Manufacturing Unlocked" mode, a "Production Unlocked" mode, and a "Debug Unlocked" mode.

Locked mode may be a default mode in which storage locations are inaccessible through a TAP. In Locked mode, key controllers 353 and 373 may prevent access to one or more keys in key storage 352 and 372, respectively.

Manufacturing Unlocked mode may entered when an unlock signal indicates that private debug commands may be used and before SOC 300 is configured as a production component. For example, Manufacturing Unlocked mode may be entered when UNLOCK signal 333 indicates the use of an authenticated debugger and PRODUCTION fuse 392 indicates that SOC 300 is in a manufacturing state, before key storage 352 and 372 have been programmed with one or more cryptographic keys. In an embodiment, policy hardware 366 and 386 may allow the use of private debug commands to access storage locations through TAPs 362 and 382, respectively, in Manufacturing Unlocked Mode regardless of whether the corresponding BLOCK_PRIVATE_COMMANDS indicator is set.

Production Unlocked mode may be entered when an unlock signal indicates that private debug commands may be used and while SOC 300 is configured as a production component. For example, Production Unlocked mode may be entered when UNLOCK signal 333 indicates the use of an authenticated debugger and both PRODUCTION fuse 392 and DEBUG fuse 394 indicate that SOC 300 is in a production state. In an embodiment, policy hardware 366 and 386 may allow the use of private debug commands to access storage locations through TAPs 362 and 382, respectively, in Production Unlocked Mode unless the corresponding BLOCK_PRIVATE_COMMANDS indicator is set.

Debug Unlocked mode may be entered when an unlock signal indicates that private debug commands may be used and while SOC 300 is configured as a customer return component. For example, Production Unlocked mode may be entered when UNLOCK signal 333 indicates the use of an authenticated debugger and DEBUG fuse 394 indicates that SOC 300 is in a debug state. In an embodiment, policy hardware 366 and 386 may allow the use of private debug commands to access storage locations through TAPs 362 and 382, respectively, in Debug Unlocked Mode regardless of whether the corresponding BLOCK_PRIVATE_COMMANDS indicator is set.

Figure 4:
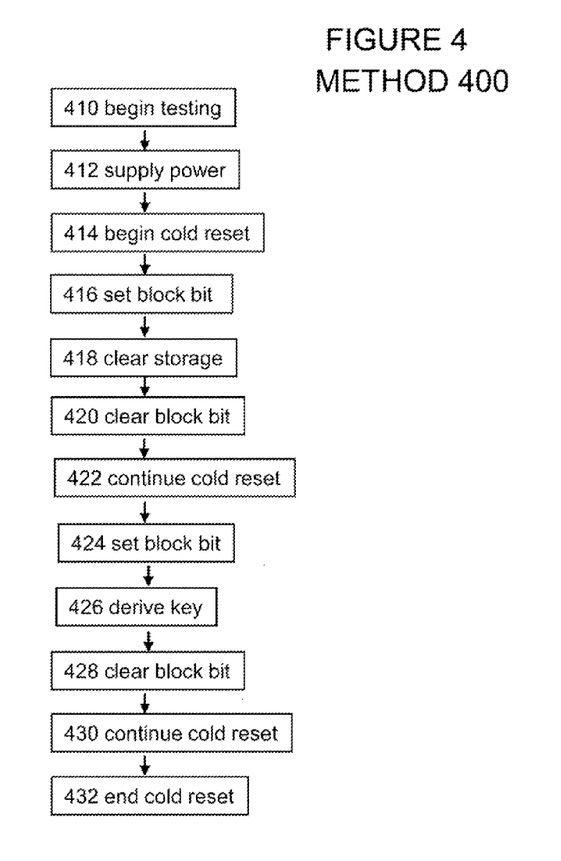
FIGS. 4, 5, and 6 illustrate methods for protecting secrets from debug attacks according to an embodiment of the present invention.
Figure 5:
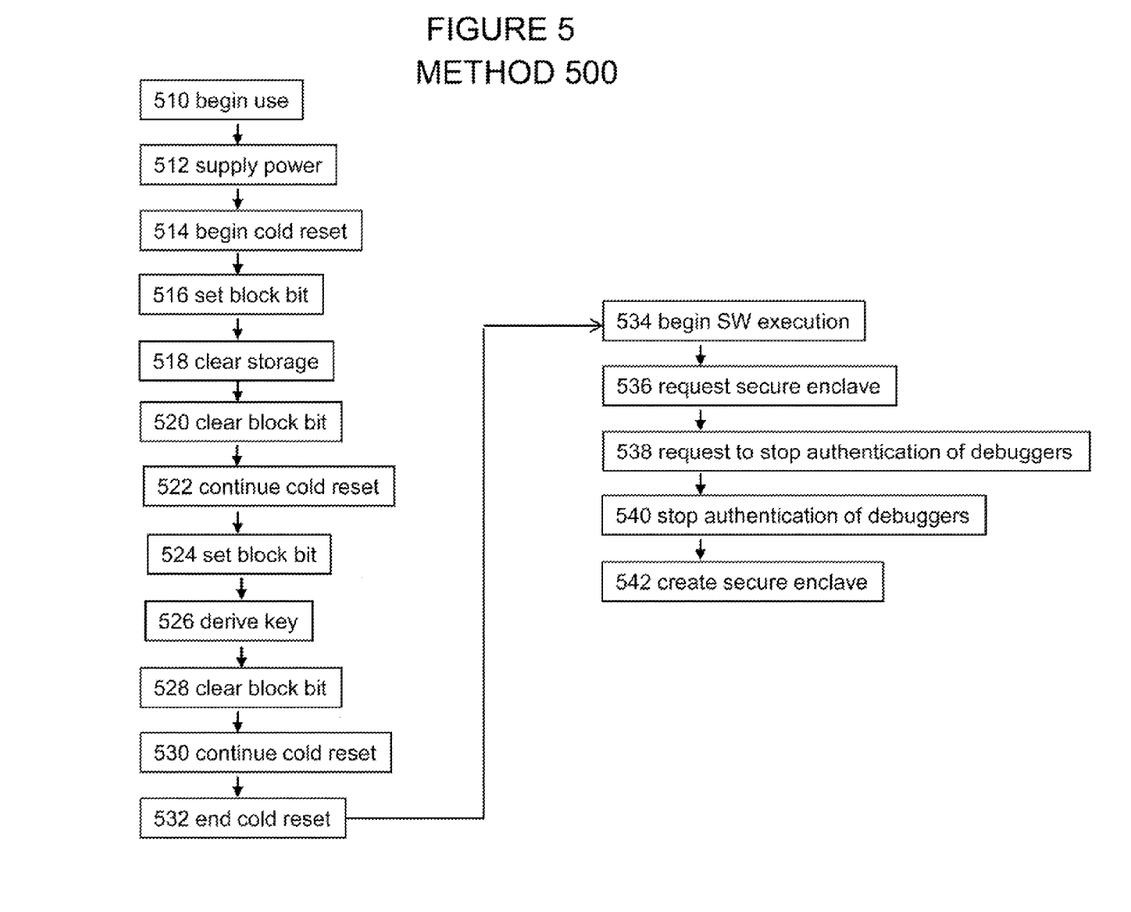
Figure 6:
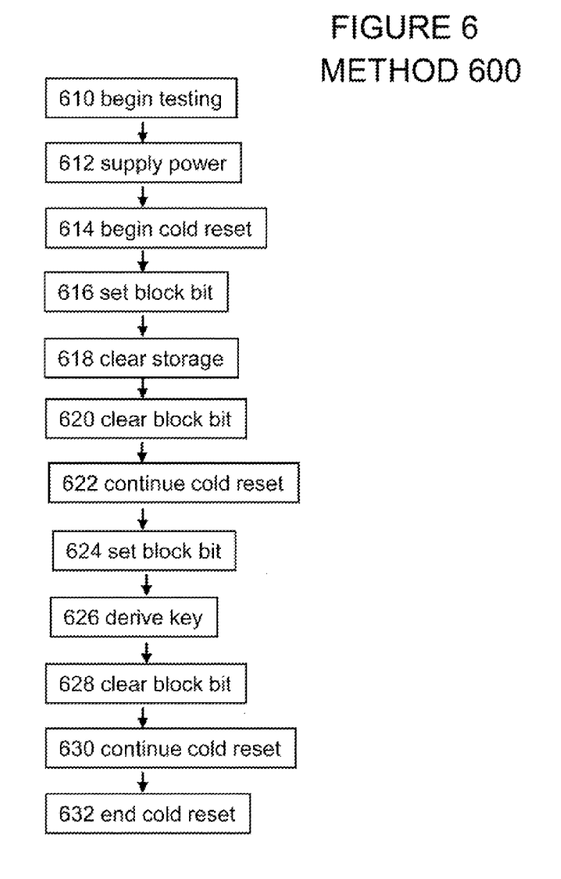

FIGS. 4, 5, and 6 illustrate methods 400, 500, and 600, respectively, for protecting secrets from debug attacks according to an embodiment of the present invention. Although method embodiments of the invention are not limited in this respect, reference may be made to elements of FIGS. 1, 2, and 3 to help describe the method embodiments of FIGS. 4, 5, and 6.

In box 410 of FIG. 4, testing of an SOC such as SOC 300 as part of its manufacturing, assembly, or test process may begin. As such, PRODUCTION fuse 392 may be in a manufacturing state. In box 412, power may be supplied to SOC 300. In box 414, the cold reset of SOC 300 may begin, where the cold reset may include, for example, the execution of a cold reset flow of microcode from processor control units 315 and 325. In box 416, BLOCK_PRIVATE_COMMANDS indicators 356 and 376 may be set, for example, as part of the cold reset microcode flow. In box 418, cache units 314 and 324 and secrets storage 354 and 374 may be cleared, for example, as part of the cold reset microcode flow.

In box 420, BLOCK_PRIVATE_COMMANDS indicators 356 and 376 may be cleared, for example, as part of the cold reset microcode flow. In box 422, the cold reset may continue. In box 424, BLOCK_PRIVATE_COMMANDS indicators 356 and/or 376 may be set, for example, as part of the cold reset microcode flow, to prepare for processor 310 and/or 320, respectively, to operate on secrets, for example, to derive a cryptographic key. In box 426, processor 310 and/or 320 may operate on secrets, for example, to derive a cryptographic key as part of the cold reset microcode flow. In box 428, BLOCK_PRIVATE_COMMANDS indicators 356 and 376 may be cleared, for example, as part of the cold reset microcode flow.

In box 430, the cold reset may continue. In box 432, the cold reset may end. Note that at any time during the cold reset of SOC 300 in method 400. i.e., any time after box 412, an unlock signal such as UNLOCK signal 333 may indicate the use of an authenticated debugger, and SOC 300 may enter Manufacturing Unlocked mode, which debug aggregator communicates to TAPs 362 and 382 over debug bus 340. Therefore, private debug commands may be used to access storage locations through TAPs 362 and 382, regardless of whether the corresponding BLOCK_PRIVATE_COMMANDS indicator is set. While UNLOCK signal 333 is set, UNLOCK signals 316 and 326, respectively, may clear key storage 352 and 372, respectively, or render them inaccessible.

In box 510 of FIG. 5, use of an SOC such as SOC 300 as a production component by a customer may begin. As such, PRODUCTION fuse 392 and DEBUG fuse 394 may both be in a production state. In box 512, power may be supplied to SOC 300. In box 514, the cold reset of SOC 300 may begin, where the cold reset may include, for example, the execution of a cold reset flow of microcode from processor control units 315 and 325. In box 516, BLOCK_PRIVATE_COMMANDS indicators 356 and 376 may be set, for example, as part of the cold reset microcode flow. In box 518, cache units 314 and 324 and secrets storage 354 and 374 may be cleared, for example, as part of the cold reset microcode flow.

In box 520, BLOCK_PRIVATE_COMMANDS indicators 356 and 376 may be cleared, for example, as part of the cold reset microcode flow. In box 522, the cold reset may continue. In box 524, BLOCK_PRIVATE_COMMANDS indicators 356 and/or 376 may be set, for example, as part of the cold reset microcode flow, to prepare for processor 310 and/or 320, respectively, to operate on secrets, for example, to derive a cryptographic key. In box 526, processor 310 and/or 320 may operate on secrets, for example, to derive a cryptographic key as part of the cold reset microcode flow. In box 528, BLOCK_PRIVATE_COMMANDS indicators 356 and 376 may be cleared, for example, as part of the cold reset microcode flow.

In box 530, the cold reset may continue. In box 532, the cold reset may end. In box 534, execution of software, such as an operating system, by processor 310 and/or 320 may begin. In box 536, a request to create a secure enclave or other protected environment may be recognized by processor 310 or processor 320, for example, in response to an operating system or other software issuing an ECREATE instruction. In box 538, in response to box 536, processor 310 or processor 320 requests debug aggregator 330 to stop authentication of debuggers until the next cold reset.

In box 540, debug aggregator 330 stops authentication of debuggers so that SOC 300 stays in Locked mode at least until the next cold reset. In box 542, a secure enclave or other protected environment is created.

Note that at any time during the cold reset of SOC 300 in method 500, i.e., any time after box 512, until authentication of debuggers is stopped in box 540, an unlock signal such as UNLOCK signal 333 may indicate the use of an authenticated debugger, and SOC 300 may enter Production Unlocked mode, which debug aggregator communicates to TAPs 362 and 382 over debug bus 340. Therefore, private debug commands may be used to access storage locations through TAPs 362 and 382 while the corresponding BLOCK_PRIVATE_COMMANDS indicator is not set, e.g. in boxes 522, 530, and 534. While UNLOCK signal 333 is set, UNLOCK signals 316 and 326, respectively, may clear key storage 352 and 372, respectively, or render them inaccessible.

In box 610 of FIG. 6, testing of an SOC such as SOC 300 after it has been returned by a customer. As such, all secrets may have been cleared from all secure enclaves and DEBUG fuse 394 may be in a debug state. In box 612, power may be supplied to SOC 300. In box 614, the cold reset of SOC 300 may begin, where the cold reset may include, for example, the execution of a cold reset flow of microcode from processor control units 315 and 325. In box 616, BLOCK_PRIVATE_COMMANDS indicators 356 and 376 may be set, for example, as part of the cold reset microcode flow. In box 618, cache units 314 and 324 and secrets storage 354 and 374 may be cleared, for example, as part of the cold reset microcode flow.

In box 620, BLOCK_PRIVATE_COMMANDS indicators 356 and 376 may be cleared, for example, as part of the cold reset microcode flow. In box 622, the cold reset may continue. In box 624, BLOCK_PRIVATE_COMMANDS indicators 356 and/or 376 may be set, for example, as part of the cold reset microcode flow, to prepare for processor 310 and/or 320, respectively, to operate on secrets, for example, to derive a cryptographic key. In box 626, processor 310 and/or 320 may operate on secrets, for example, to derive a cryptographic key as part of the cold reset microcode flow. In box 628, BLOCK_PRIVATE_COMMANDS indicators 356 and 376 may be cleared, for example, as part of the cold reset microcode flow.

In box 630, the cold reset may continue. In box 632, the cold reset may end. Note that at any time during the cold reset of SOC 300 in method 400, i.e., any time after box 612, an unlock signal such as UNLOCK signal 333 may indicate the use of an authenticated debugger, and SOC 300 may enter Manufacturing Unlocked mode, which debug aggregator communicates to TAPs 362 and 382 over debug bus 340. Therefore, private debug commands may be used to access storage locations through TAPs 362 and 382, regardless of whether the corresponding BLOCK_PRIVATE_COMMANDS indicator is set. While UNLOCK signal 333 is set, UNLOCK signals 316 and 326, respectively, may clear key storage 352 and 372, respectively, or render them inaccessible.

In various embodiments of the present invention, the methods illustrated in FIGS. 4, 5, and 6 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of methods 400, 500, and 600 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for protecting secrets from debug attack have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
beginning a reset of a processor;
authenticating a debugger;
determining that the processor is in a production mode based on a production value of a fuse;
sending a policy from a debug aggregator to a test access port in the processor, the policy to indicate that the processor is in the production mode;
preventing access to storage in the processor through the test access port in response to the test access port receiving the policy;
creating a secure enclave after the reset;
storing secrets of the secure enclave in the storage;
configuring the fuse to a debug value;
determining that the processor is in a debug mode based on the debug value of the fuse;
sending the policy from the debug aggregator to the test access port, the policy to indicate that the processor is in the debug mode;
providing access to the storage through the test access port in response to the test access port receiving the policy indicating that the processor is in the debug mode.

2. The method of claim 1, including setting an indicator during the reset, wherein preventing access to the storage is also in response to the indicator being set.

3. The method of claim 2, further comprising clearing the storage.

4. The method of claim 3, further comprising clearing the indicator in response to the storage being cleared.

5. The method of claim 4, further comprising allowing access to the storage through the test access port in response to the indicator being cleared.

6. The method of claim 2, further comprising operating on secrets in the storage by the processor in response to the indicator being set.

7. The method of claim 6, further comprising clearing the indicator after operating on the secrets.

* * * * *